July 17, 1956  H. D. GULNAC  2,755,441
COUNTING RATE METER
Filed Dec. 11, 1953
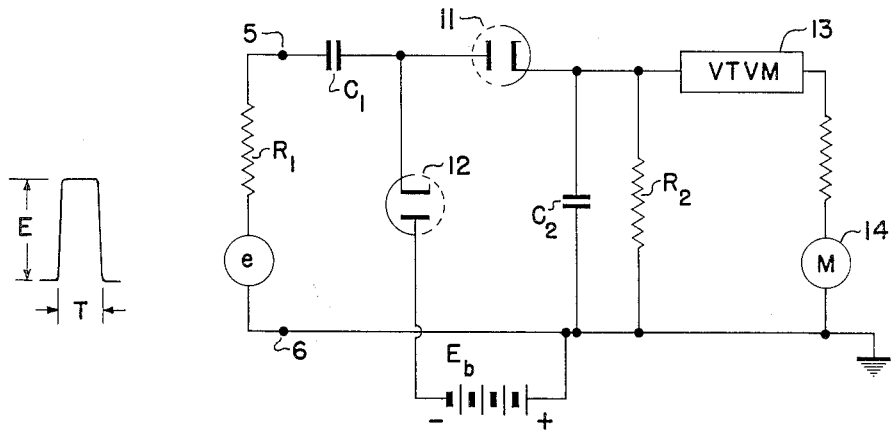
*Fig. 1 (Old Art)*
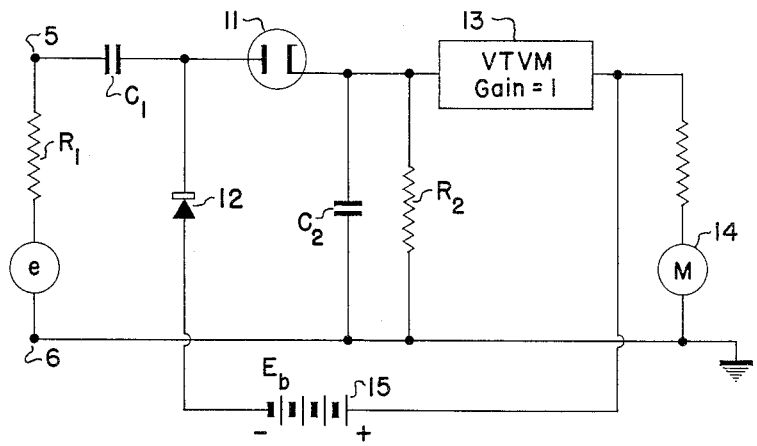
*Fig. 2*
WITNESSES:
Ralph Carlisle Smith
Henry Heyman
INVENTOR:
Howard D. Gulnac
BY
Roland A. Anderson
Attorney

United States Patent Office 2,755,441
Patented July 17, 1956

2,755,441

COUNTING RATE METER

Howard D. Gulnac, Santa Cruz, N. Mex., assignor to the United States of America as represented by the United States Atomic Energy Commission Application December 11, 1953, Serial No. 397,807

4 Claims. (Cl. 324—78)

This invention relates to impulse rate of occurence electronic counting intruments and more particularly to rate counting apparatus wherein the observed impulses are rectified, integrated and impressed on a vacuum tube voltmeter.

Apparatus of this nature is well known in the art and in general comprises a network consisting of a first rectifier serially connected with a shunt connected resistance and storage capacitor across the input terminals; a second or clamper rectifier serially connected with a bias source is connected across the network to permit unidirectional charging of the second capacitor and to stabilize the potential on the input electrode of the first rectifier. A voltmeter preferably of the vacuum tube type is connected with its input across the said resistance. Such a device is shown for example in Electronics, page 251, by William C. Elmore and Matthew Sands, published by McGraw-Hill Book Company.

It is a desirable characteristic of counting rate meters that they behave in a linear fashion, that is, that the voltage developed be linearly proportional to the frequency of observed input impulses.

Such linear behavior is obtainable in the circuits of the prior art only if the input impulse amplitude is very large, i. e., in the neighborhood of 100 times the output or integrated voltage, and if the integrated voltage is large i. e., ten times the bias potential on the shunt rectifier. These requirements result in inconvenient voltages and sizes of power packs, particularly in portable instruments. For example, it is common to utilize a negative bias of 2 volts on the clamper rectifier with the result that the required amplitude for the input impulses is 2,000 volts, for a linearity of one per cent. The generation of input impulses of this magnitude is inconvenient.

It is a prime objective of the present invention to modify the input impulse rectifying and integrating circuits so as to obtain the desired linearity without the requirement of large amplitude input impulses.

An understanding of the manner in which the foregoing objective is obtained will become clear from the following specification taken with the drawing made a part of this specification.

In the drawing:

Figure 1 is a schematic of the circuit of the old art and is so marked.

Figure 2 is a simplified schematic of the apparatus arranged in accordance with the teachings of the present invention.

Referring to Figure 1, a circuit of the prior art is shown. The impulse generator output is shown as a generator $e$ and resistor $R_1$. The amplitude of output impulse derived from the free ends of $e$ and $R_1$ is denoted as E. A serially connected network of capacitor $C_1$, rectifier 11 and shunt connected RC network $R_2$—$C_2$ is connected in series with the impulse generator output by means of input terminals 5 and 6. In shunt with serially connected rectifier 11 and network $R_2$—$C_2$ is a clamper rectifier 12 in series with a bias source $E_b$. Resistor $R_2$ connected in shunt with the storage capacitor $C_2$ is a bleeder resistance.

The parameters of such a circuit for effective and linear behavior is as follows:

$$\frac{1}{n} \gg T > 5R_1C_1$$

where $n$ is the counting rate, T is the input impulse duration, $R_1$ is the impulse generator output resistance, and $C_1$ is the input series capacitance.

$$E \gg V > E_b$$

wherein E is the input impulse amplitude, V is the integrated output potential and $E_b$ is the bias potential on the shunt rectifier.

$$C_2 \gg C_1$$

wherein $C_2$ is the storage capacitance.

It has been found that in order for the counting rate meter to be accurate and linear for a high rate of impulse occurrence V should be about 10 times $E_b$ and E should be 100 times V. The values which result, in the event $E_b$ is 2 volts, is 20 volts for V and 2,000 volts for E.

The reason for this is that as the counting proceeds, $C_2$ builds up a charge thereby creating a bias on series rectifier 11 which decreases the amount of charge obtainable from succeeding input impulses. In order for the increasing bias to have negligible effect, its incremental increase must be negligible compared to the amplitude of the observed impulses.

It has been found that if the bias across series rectifier 11 is maintained at a constant value, the apparatus can add equal increments of charge to $C_2$ upon the impression on the input thereof of a series of impulses. Further, under these conditions the input impulses can have a reasonable value, such as for example in the neighborhood of 25 volts.

The manner in which this invention is utilized is shown in Figure 2. A vacuum tube voltmeter 13 of gain 1 is serially connected with a milliammeter 14 across the storage capacitor $C_2$. However, the return leg of clamper rectifier 12 through bias source 15 is no longer returned to the unipotential or ground bus of the assembly, but instead, it is connected to the output side of vacuum tube voltmeter 13. The effect of this arrangement is the maintenance of a constant bias potential across series rectifier 11. As the counting rate increases, and the integrated output potential increases on meter 14 the increased potential raises the anode of rectifier 11 through bias source 15 and clamper rectifier 12. Consequently, succeeding input impulses add equal increments of charge to storage capacitor $C_2$ and therefor equal increments of potential across milliameter 14.

The salient features of this invention have been described in detail with respect to one embodiment, but it is apparent that modifications may be made within the spirit and scope of this invention. It is understood, therefore, that it is not desired that the invention be limited to the exact details shown except insofar as they may be defined in the following claims.

What is claimed is:

1. A counting rate meter comprising a rectifier serially connected to a shunt connected RC network, a network comprising a vacuum tube voltmeter serially connected to a voltage responsive instrument connected across said RC network, a network comprising a second rectifier serially connected with a bias source connected between the input electrode of the first mentioned rectifier and the output of the vacuum tube voltmeter, a capacitor serially connected to the input electrode of the first mentioned rectifier, an input terminal connected to the free end of the last mentioned capacitor, a second input terminal connected to the RC network at the end thereof remote from the end connected to the first mentioned rectifier.

2. The apparatus recited in claim 1 in which the vacuum tube voltmeter has a gain of one.

3. The apparatus of claim 1 in which the rectification directions of the first mentioned rectifier and the second mentioned rectifier are in opposition with respect to the input terminals.

4. A counting rate meter comprising a first rectifier connected to a shunt-connected RC network, a second network comprising a vacuum tube voltmeter having a gain of one serially connected to a voltage responsive instrument connected across said RC network, a third network comprising a second rectifier serially connected with a constant voltage bias source, said third network being connected between the input electrode of the first rectifier and the output of said vacuum tube voltmeter, a capacitor serially connected to the input electrode of said first rectifier, an input terminal connected to the free end of the last mentioned capacitor, and a second input terminal connected to said RC network at the end thereof remote from the end connected to said first rectifier.

References Cited in the file of this patent

UNITED STATES PATENTS

| | | |
|---|---|---|
| 2,573,150 | Lacy | Oct. 30, 1951 |
| 2,619,618 | Adler | Nov. 25, 1952 |